Aug. 24, 1965    R. G. THOMPSON ETAL    3,202,164
LIQUID SOLUTION FEEDING DEVICE
Filed May 3, 1963
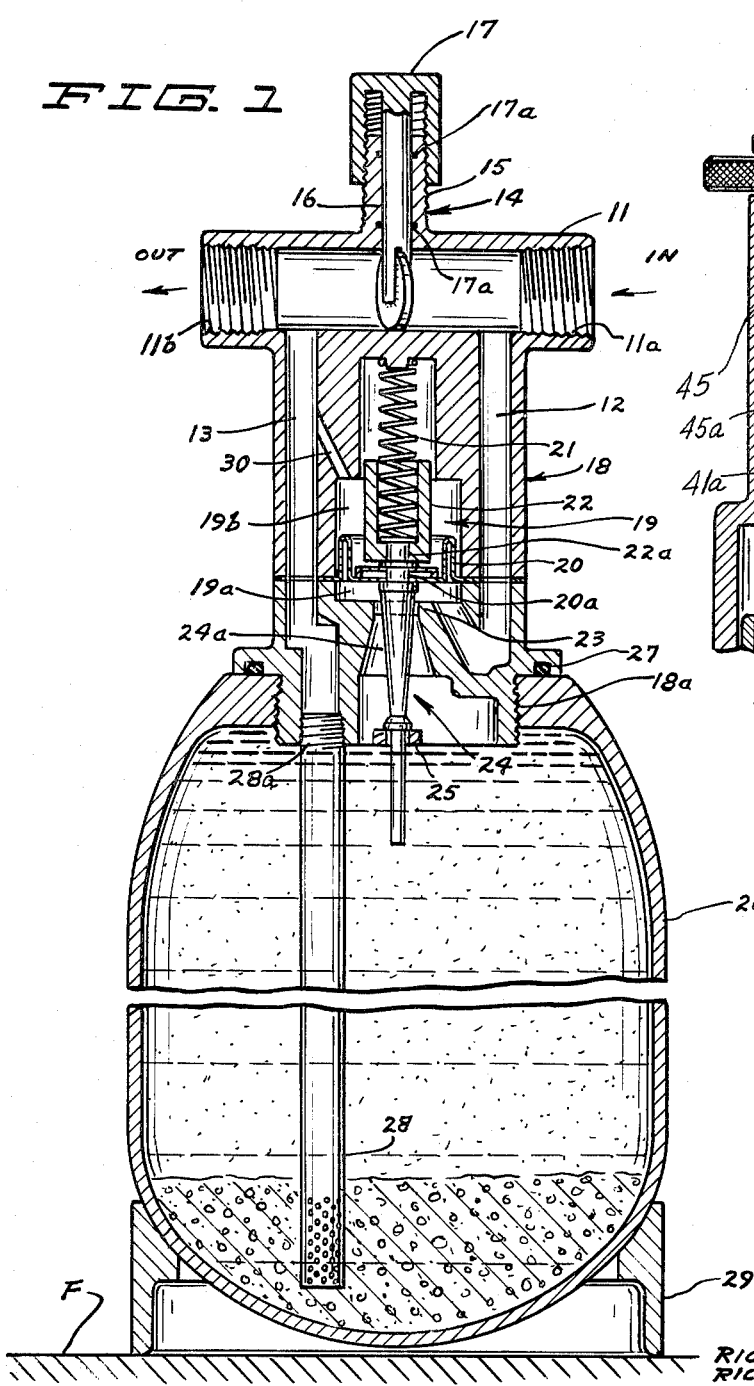
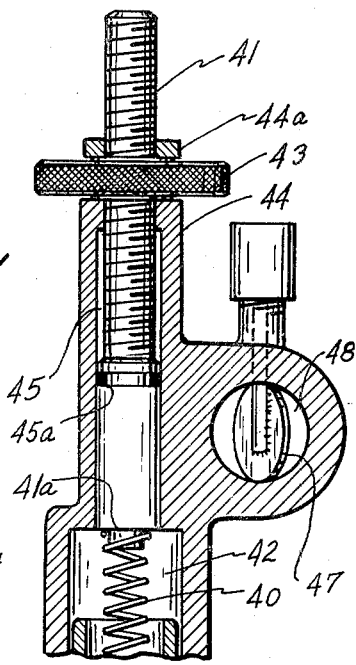
INVENTORS
RICHARD G. THOMPSON
RICHARD D. TYLER
BY THOMAS W. TECHLER
John W. Adams
ATTORNEY United States Patent Office 3,202,164
Patented Aug. 24, 1965

3,202,164
LIQUID SOLUTION FEEDING DEVICE
Richard G. Thompson, Stillwater, Richard D. Tyler, St. Paul, and Thomas W. Techler, North St. Paul, Minn., assignors to Union Tank Car Company, Jersey City, N.J., a corporation of New Jersey
Filed May 3, 1963, Ser. No. 277,772
5 Claims. (Cl. 137—101.11)

This invention relates to an improvement in a chemical additive device which is designed to maintain a pre-selected concentration of additive in the flow line by introducing the additive in quantities which are in direct proportion to the rate of flow of liquid through the line.

In the past, various additive devices have been used for adding chemicals and the like to liquid flow lines, but in general these devices have not been adjustable to allow variation of additive concentration nor have they been responsive to variations of flow through the line such that the desired concentration is maintained.

Applicants' invention, however, provides means for maintaining the introduction of additive in direct proportion to the rate of flow through the flow line and further allows adjustment means by which the concentration may be varied.

It is a specific object of this invention to provide a pressure responsive control member which is responsive to flow rate variances in a liquid flow line to control and maintain the proper pre-selected proportion of additive to be introduced into the flow line in accordance with the flow rate therethrough.

It is a further specific object of this invention to provide means for controlling the introduction of additives into a liquid flow line wherein the additive-containing solution does not come in contact with or pass through the control member such that the control member may operate in a substantially untreated medium thus preventing additive deposits from forming on the surface thereof and insuring proper operation of the control member.

It is a further object of this invention to provide control adjustment means such that the responsiveness of the additive control member may be pre-set to control the proportion of additive to be introduced into the flow line.

It is a further specific object of this invention to provide means to vary the rate of flow through a liquid flow line to control the actuation pressure upon a pressure-responsive control member and thereby control the proportion of additive to be introduced into the flow line.

It is a further specific object to provide a flow control member specifically designed to control the additive introduced into a flow line such that the additives will be introduced in direct proportion to the rate of flow therethrough.

These and other objects and advantages of this invention will more fully appear from the following description made in connection with the accompanying drawings, wherein like reference characters refer to the same or similar parts throughout the several views, and in which:

FIG. 1 is a vertical section of the preferred form of the invention; and

FIG. 2 is a vertical section showing a modified form of the control mechanism for the invention.

To introduce additives, such as chemicals or the like, into a fluid flow line, a liquid additive container is provided with a connective line section 11 having internally threaded end portions 11a and 11b for threaded engagement with a source flow line. A means to control the flow through the source flow line is provided in the form of a butterfly valve 17 sealingly contained within a boss member 14 on the outer periphery of the line section 11 and is threadedly engaged with external threads 15 on the boss member 14 and is received into a passage 16 of the boss member 14 and sealed therein by O-rings 17a or the like. Rotation of this flow restricting butterfly valve 17, will, of course, produce a pressure differential on either side thereof.

In the form shown and with the direction of the flow being from right to left as seen in FIG. 1, the high pressure side will exist to the right of the butterfly valve 17 and the low pressure side to the left. An additive control member housing 18 is arranged adjacent the flow line section 11 and is provided with a pair of passages 12 and 13 communicating therewith such that passage 12 will communicate with the high pressure side of the flow line and the passage 13 respectively with the low pressure side. A pressure differential control chamber 19 is arranged within the housing 18 and is divided by a pressure-responsive diaphragm or control member 20 into a high pressure chamber 19a communicating with passage 12 and a low pressure section 19b communicating with low pressure passage 13 through a second connecting passage 30. In the form shown, the control member 20 is arranged to be movable throughout the entire longitudinal length of the differential chamber 19 and is arranged with a central passage 20a therethrough for the attachment of elements which are controlled and actuated thereby.

In the form shown, the low pressure chamber 19b is provided with a balance spring mechanism which includes a compression spring member 21 having one end thereof in abutment with a wall of the low pressure chamber 19b and the other end thereof contained within a substantially hollow centering element 22 which has its closed end thereof in abutment with the control member 20 such that as high pressure fluid enters the high pressure chamber 19a and exerts a force upwardly against the control member 20, this force may be substantially balanced by the spring 21 arranged therebehind. A needle valve member, generally designated 24, is arranged within the high pressure section 19a of the pressure chamber 19 and has one end thereof arranged to pass through the central aperture 20a of the control member where it is threadedly received into a mating passage 22a in the closed end of the centering element 22. In this manner the valve 24, control member 20 and balancing arrangement comprising the spring 21 and centering element 22 will oscillate as one unit.

A valve seat 23 is provided within the housing 18 and surrounds the valve member 24 and allows communication between the high pressure compartment 19a and an additive tank 26 arranged below the housing 18 such that as fluid flows through the passage 12 and into the high pressure chamber 19a, it will force the valve member 24 upward away from the valve seat 23 opening the same to allow this water to flow downward into the additive tank 26 and mix with additive therein. A valve centering bearing 25 is arranged to maintain the valve 24 in concentric alignment with the valve seat 23.

In the form shown, the housing 18 is provided with a threaded bottom portion 18a thereon to be received into a mating opening in the additive tank 26 and is sealed thereto by sealing means such as the O-ring 27 on the upper surface thereof. A riser tube 28 is threadedly connected to the passage 13 at the lower extreme portion of the housing 18 such that the riser tube will extend to the bottom of the additive tank 26 receiving chemicals and water therein to flow upwards therethrough and be added to the liquid source line 11 on the low pressure side of the butterfly valve 17.

As shown in the drawings, a filter system, such as gravel, may be arranged at the bottom of the additive tank 26 and a support means 29 may be provided such that the tank may rest on the floor.

It is obvious from this construction that the high pressure water flowing through the line 11 will divert a portion thereof into the passage 12 and high pressure chamber 19a where it will force the control member 20 and valve 24 upwardly to open the passage into the additive tank 26. There it will combine with the additive solution and force a like amount upward through the riser tube and low pressure passage 13 into the source line 11. To maintain the flow through the additive system in direct proportion to the flow of water through the flow line 11, the surface 24a of the valve 24 has been mathematically determined from the following process in which the valve seat opening 23 has been predetermined and it is desirable to determine the varying diameters of the valve member 24. Therefore, "D" is taken as the constant factor valve opening 23 and "d" is the diameter of the valve member 24 at any point.

$$\text{Pi}\left(\frac{D}{2}\right)^2 - \text{pi}\left(\frac{d}{2}\right)^2 = K_1 V$$

(1) Let "F" be directly proportional to pressure drop; this is a characteristic of the spring from the established formula:

$$F = \frac{8PND^3}{Gd^4}$$

Load "P" on the spring is directly proportional to head loss "H" across the restrictor, since the diaphragm is entirely free-acting. Therefore, $F = K_2 H$ (2) Then, from establisher formula:

$$H = K_3 \frac{V^2}{32g}$$

let $$\frac{K_3}{2g} = K_4$$

then $$H = K_4 V^2$$

or, $$K_2 H = K_2 K_4 V^2 = F$$

let $$K_2 K_4 = K_5$$

$$F = K_5 V^2; \quad V = \sqrt{\frac{F}{K_5}}$$

(3) $$\text{Pi}\left(\frac{D}{2}\right)^2 - \text{pi}\left(\frac{d}{2}\right)^2 = K_1 V$$

(from "Required" above)

since D is a constant, let $$\text{Pi}\left(\frac{D}{2}\right)^2 = K_6$$

$$K_6 - \text{pi}\left(\frac{d}{2}\right)^2 = K_1 V$$

$$K_6 - .785 d^2 = K_1 V$$

then, by substitution:

$$K_6 - .785 d^2 = K_1 \sqrt{\frac{F}{K_5}}$$

$$.785 d^2 = K_6 - K_1 \sqrt{\frac{F}{K_5}}$$

$$d^2 = \frac{K_6 - K_1 \sqrt{\frac{F}{K_5}}}{.785}$$

let $$\frac{K_1}{\sqrt{K_5}} = K_7$$

then $$d^2 = \frac{K_6 - K_7 \sqrt{F}}{.785}$$

$$d = \sqrt{\frac{K_6 - K_7 \sqrt{F}}{.785}}$$

This formula defines "d" in terms of the travel of the needle valve 24 such that the opening between the valve seat 23 and the valve 24 will allow a flow directly proportional to the flow rate of the main line.

In operation of the preferred apparatus the additive may be placed in the additive tank either in solution or as particles through an opening in the tank (not shown). Adjustment of the butterfly valve 17 will create a pressure differential on either side thereof which may be tabulated such that a rotation of the valve at a corresponding flow rate will produce a certain pressure differential and therefore a specified additive concentration. It is then only necessary to connect the flow line section 11 into a flow line.

In a modified form of the control mechanism, as shown in FIG. 2, a method of adjusting the balance spring member 40 is provided and in all other principles the modified form acts in exactly the same manner as the preferred form.

In this form, an adjustment member, such as a threaded rod 41, is sealingly captured in a passage 45 which communicates with a low pressure chamber 42 of the pressure differential chamber and is sealed therein by an O-ring 45a. Advancing means for the threaded rod 41 may comprise a hand wheel 43 rotatably mounted on a housing 44 and restrained from axial movement by a shoulder member 44a such that when the hand wheel is rotated, the rod 41 will pass axially therethrough. On end 41a of the rod is arranged in compressing relation to the balance spring 40 such that as it moves axially into the pressure chamber 32, the effective length of the spring will be reduced therefore requiring a higher pressure to compress the same and actuate the valve member in the same manner as the preferred form.

In this modified form, a flow differential mechanism such as the butterfly valve 47 is provided in the flow line 48 and operates in the same manner as the preferred form which is to create a pressure differential between the sides thereof. Although the preferred form shows the butterfly valve 47, it is obvious that sufficient control may be established over the additive introduction by use of the balance spring compressor arrangement that this valve may be eliminated.

In operation of the modified form rotation of the hand wheel 43, as previously stated, will change the effective length of the balance spring 40 such that the pressure responsive control member associating therewith will be responsive to either greater or less pressure as determined by a change of length in the balance spring 40 and therefore control the valve 24 travel.

It is obvious that applicants have provided a uniquely simple method of controlling the additive in a liquid flow line which will insure the introduction of additive thereto in direct proportion to the flow through the line.

It will, of course, be understood that various changes may be made in the form, details, arrangement and proportion of the parts without departing from the scope of our invention, which generally stated consists in the matter set forth in the appended claims.

What we claim is:

1. In apparatus for feeding a liquid into fluid flowing through a conduit, comprising:
    (A) coupling means connectable to said conduit so that said fluid flows therethrough, (B) means restricting flow through said coupling means so that the fluid pressure on the upstream side of said flow restricting means is greater than on its downstream side,
(C) means containing a supply of said liquid,
(D) pressure responsive means in a chamber,
(E) means defining a first passage connecting one side of said pressure responsive means to said coupling on the upstream side of said flow restricting means, and
(F) means defining a second passage connecting said liquid containing means to said coupling on the downstream side of said flow restricting means, said second passage communicating with the other side of said pressure responsive means, the improvement in means for maintaining a substantially constant proportion of said liquid in said fluid even though the flow rate of said fluid varies, comprising:

(1) means defining a valve opening connecting said chamber to said liquid containing means, said valve opening providing the only passage permitting fluid in said first passage to enter said liquid containing means, and
(2) valve means connected to said pressure responsive means so as to move to vary the size of said valve opening to cause fluid from said first passage to flow therethrough in direct proportion to the rate of flow of fluid in said conduit.

2. In apparatus for feeding a liquid into fluid flowing through a conduit, comprising:

(A) coupling means connectable to said conduit so that said fluid flows therethrough,
(B) means restricting flow through said coupling means so that the fluid pressure on the upstream side of said flow restricting means is greater than on its downstream side,
(C) means containing a supply of said liquid,
(D) a pressure responsive diaphragm in a chamber,
(E) means defining a first passage connecting one side of said diaphragm to said coupling on the upstream side of said flow restricting means, and
(F) means defining a second passage connecting said liquid containing means to said coupling on the downstream side of said flow restricting means, said second passage communicating with the other side of said diaphragm, whereby said diaphragm is movable in response to differences in pressure between said first and second passages, the improvement in means for maintaining a substantially constant proportion of said liquid in said fluid even though the flow rate of said fluid varies, comprising:

(1) means defining a valve opening connecting said chamber to said liquid containing means, said valve opening providing the only passage permitting fluid in said first passage to enter said liquid containing means,
(2) a tapered valve element connected to said diaphragm and movable through said valve opening to vary the size of said valve opening so as to cause fluid from said first passage to flow into said liquid containing means in direct proportion to the rate of flow of fluid in said conduit.

3. In apparatus for feeding a liquid into fluid flowing through a conduit, comprising:

(A) coupling means connectable to said conduit so that said fluid flows therethrough,
(B) means restricting flow through said coupling means so that the fluid pressure on the upstream side of said flow restricting means is greater than on its downstream side,
(C) means containing a supply of said liquid,
(D) a pressure responsive diaphragm in a chamber,
(E) means defining a first passage connecting one side of said diaphragm to said coupling on the upstream side of said flow restricting means, and
(F) means defining a second passage connecting said liquid containing means to said coupling on the downstream side of said flow restricting means, said second passage communicating with the other side of said diaphragm, whereby said diaphragm is movable in response to differences in pressure between said first and second passages, the improvement in means for maintaining a substantially constant proportion of said liquid in said fluid even though the flow rate of said fluid varies, comprising:

(1) means defining a valve opening connecting said chamber to said liquid containing means, said valve opening providing the only passage permitting fluid in said first passage to enter said liquid containing means,
(2) a conical valve element connected to said diaphragm and being movable in said valve opening,
(3) spring means urging said element to decrease the size of said valve opening, and
(4) movement of said diaphragm causing said element to move to vary the size of said valve opening so as to cause fluid from said first passage to flow into said liquid containing means in direct proportion to the rate of flow of fluid in said conduit.

4. In apparatus for feeding a liquid into fluid flowing through a conduit, comprising:

(A) coupling means connectable to said conduit so that said fluid flows therethrough,
(B) means restricting flow through said coupling means so that the fluid pressure on the upstream side of said flow restricting means is greater than on its downstream side,
(C) means containing a supply of said liquid,
(D) a pressure responsive diaphragm in a chamber,
(E) means defining a first passage connecting one side of said diaphragm to said coupling on the upstream side of said flow restricting means, and
(F) means defining a second passage connecting said liquid containing means to said coupling on the downstream side of said flow restricting means, said second passage communicating with the other side of said diaghragm, whereby said diaphragm is movable in response to differences in pressure between said first and second passages, the improvement in means for maintaining a substantially constant proportion of said liquid in said fluid even though the flow rate of said fluid varies, comprising:

(1) means defining a valve opening connecting said chamber to said liquid containing means, said valve opening providing the only passage permitting fluid in said first passage to enter said liquid containing means,
(2) a conical valve element having its larger end supported by said diaphragm so as to be movable therewith, said element passing through said valve opening,
(3) bearing means supporting the smaller end of said element,
(4) spring means on said other side of said diaphragm urging said element to decrease the size of said valve opening, and
(5) movement of said diaphragm causing said element to move to vary the size of said valve opening so as to cause fluid from said first passage to flow into said liquid containing means in direct proportion to the rate of flow of fluid in said conduit.

5. In apparatus for feeding a first liquid into a second liquid flowing through a conduit, comprising:

(A) coupling means connectable to said conduit so that said second liquid flows therethrough,
(B) an adjustable valve restricting flow through said coupling means so that the pressure on the upstream side of said adjustable valve is greater than on its downstream side,
(C) means containing a supply of said first liquid,
(D) a pressure responsive diaphragm in a chamber, (E) means defining a first passage connecting one side of the diaphragm to said coupling on the upstream side of said adjustable valve, and (F) means defining a second passage connecting said liquid containing means to said coupling on the downstream side of said adjustable valve, said second passage communicating with the other side of said diaphragm, whereby said diaphragm is movable in response to differences in pressure between said first and second passages, the improvement in means for maintaining a substantially constant proportion of said first liquid in said second liquid even though the flow rate of said second liquid varies, comprising:

(1) means defining a valve opening connecting said chamber to said liquid containing means, said valve opening providing the only passage permitting said second liquid in said first passage to enter said liquid containing means, (2) a conical valve element having its larger end supported by said diaphragm in said chamber so as to be movable therewith, said element passing through said valve opening, (3) bearing means outside said chamber supporting the smaller end of said element, (4) adjustable spring means on said other side of said diaphragm urging said element to decrease the size of said valve opening, and (5) movement of said diaphragm causing said element to move to vary the size of said valve opening so as to cause said second liquid in said first passage to flow into said liquid containing means in direct proportion to the rate of flow of said second liquid in said conduit.

References Cited by the Examiner

UNITED STATES PATENTS

| | | | |
|---|---|---|---|
| 1,804,751 | 5/31 | Doble | 137—117 |
| 1,917,704 | 7/33 | Dresher | 137—101.11 |
| 2,219,488 | 10/40 | Parker | 137—115 XR |
| 2,234,561 | 3/41 | Kittredge | 137—9 |
| 2,714,963 | 8/55 | Lester | 137—101.11 |
| 2,789,576 | 4/57 | Mitchell | 137—117 |
| 2,990,848 | 7/61 | Wilson | 137—205.5 XR |
| 3,060,956 | 10/62 | Menzie | 137—205.5 |

M. CARY NELSON, *Primary Examiner.*